(12) United States Patent
Lim et al.

(10) Patent No.: US 8,495,000 B2
(45) Date of Patent: Jul. 23, 2013

(54) DATA INTEGRATION APPARATUS AND METHOD

(75) Inventors: Sunmin Lim, Daejeon (KR); Sang Won Kim, Daejeon (KR); Changhyun Park, Seoul (KR); Myung Sun Song, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 882 days.

(21) Appl. No.: 12/619,060

(22) Filed: Nov. 16, 2009

(65) Prior Publication Data

US 2010/0161545 A1 Jun. 24, 2010

(30) Foreign Application Priority Data

Dec. 22, 2008 (KR) ........................ 10-2008-0131176

(51) Int. Cl.
*G06N 7/02* (2006.01)
(52) U.S. Cl.
USPC ......................................................... 706/52
(58) Field of Classification Search
None
See application file for complete search history.

(56) References Cited

U.S. PATENT DOCUMENTS

| 2003/0186663 A1 | 10/2003 | Chen et al. |
| 2005/0062605 A1* | 3/2005 | Sutphin ................... 340/539.26 |
| 2006/0239559 A1 | 10/2006 | Maris |

FOREIGN PATENT DOCUMENTS

| KR | 1020100128393 A | 12/2010 |
| WO | 2006/076798 A1 | 7/2006 |
| WO | 2009/115957 A2 | 9/2009 |

OTHER PUBLICATIONS

Qi, Hairong, et al.; Mobile-Agent-Based Collaborative Signal and Information Processing in Sensor Networks; 2003; Proceedings of the IEEE, vol. 91, No. 8; pp. 1172-1183.*
Varshney, P. K.; "Multisensor data fusion"; 1997; "Electronics & Communication Engineering Journal"; pp. 245-253.*

* cited by examiner

*Primary Examiner* — Jeffrey A Gaffin
*Assistant Examiner* — Stanley K Hill
(74) *Attorney, Agent, or Firm* — Ladas & Parry LLP

(57) ABSTRACT

Provided are a data integration apparatus and method using a weight factor. The data integration apparatus receives sensing information from at least one sensing device, the sensing information including a value indicating the existence of signals and confidence estimated parameters indicating the degree of confidence for the value indicating the existence of signals, and then generates the weighting factor based on the confidence estimated parameters. Then, the value indicating the existence of signals and the weighting factor are used to produce characteristic values of each sensing device and to finally determine the existence of signals.

8 Claims, 6 Drawing Sheets

DATA INTEGRATION APPARATUS AND METHOD

CROSS-REFERENCE TO RELATED PATENT APPLICATION

This application claims the benefit of Korean Patent Application No. 10-2008-0131176, filed on Dec. 22, 2008, in the Korean Intellectual Property Office, the disclosure of which is incorporated herein in its entirety by reference.

BACKGROUND OF THE INVENTION

1. Field of the Invention

The present invention relates to data integration using a weighting factor, and more particularly, to a data integration apparatus and method of combining results from various sensing devices using a weight factor and producing a final sensing result.

2. Description of the Related Art

In a conventional data integration method, a final sensing result is produced using only signals in each sensing device. The conventional data integration method is classified into a decision integration method using AND, OR, and Majority logics and a method using prior probabilities such as Bayesian detection and the Neyman-Pearson test.

In the method using prior probabilities, the existence of signals may not be known in an actual circumstance. Accordingly, the prior probabilities cannot be estimated and used so that the conventional decision integration method is generally used.

In the conventional decision integration method, advantages and disadvantages exist in each of its types. For example, in the decision integration method using AND logic, when some of the sensing devices cannot detect a signal due to an environmental factor such as fading, an error, which is a sensing result finally indicating that a signal does not exist, may be generated. However, the probability of false alarm is low.

In the decision integration method using OR logic, although a hidden terminal problem occurs, when some of the sensing devices determine that a signal exists, it is determined that a signal exists as a final sensing result. However, when a signal does not exist, the probability of false alarm increases due to a sensing error.

The decision integration method using Majority logic is between the former two methods. When the Majority logic is formed of nodes having a similar signal to noise ratio (SNR), an excellent performance is shown. However, when there is a difference of SNR in each sensing device, the performance of the Majority logic is lower than that of the OR logic.

As described above, the disadvantages above may be problems to actually realize the data integration method.

SUMMARY OF THE INVENTION

In order to solve conventional problems, a data integration method, which can be applied regardless of a similar signal to noise ratio (SNR) condition in each sensing device, is required.

The present invention provides a data integration apparatus and method using a weighted vector indicating the most excellent performance from among AND, OR, Majority logic methods, even in SNR-unknown conditions.

According to an aspect of the present invention, there is provided data integration apparatus including: an information receiving unit receiving sensing information from at least one sensing device, the sensing information comprising a value indicating the existence of signals and confidence estimated parameters indicating the degree of confidence for the value indicating the existence of signals; a weight reflecting unit generating a weighting factor based on the confidence estimated parameters; and a confidence producing unit producing characteristic values indicating the degree of confidence of the sensing information transmitted from each sensing device using the value indicating the existence of signals and the weighting factor.

According to another aspect of the present invention, there is provided a data integration method including: receiving sensing information from at least one sensing device, the sensing information comprising a value indicating the existence of signals and confidence estimated parameters indicating the degree of confidence for the value indicating the existence of signals; generating a weighting factor based on the confidence estimated parameters; and producing characteristic values indicating the degree of confidence of the sensing information transmitted from each sensing device using the value indicating the existence of signals and the weighting factor.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
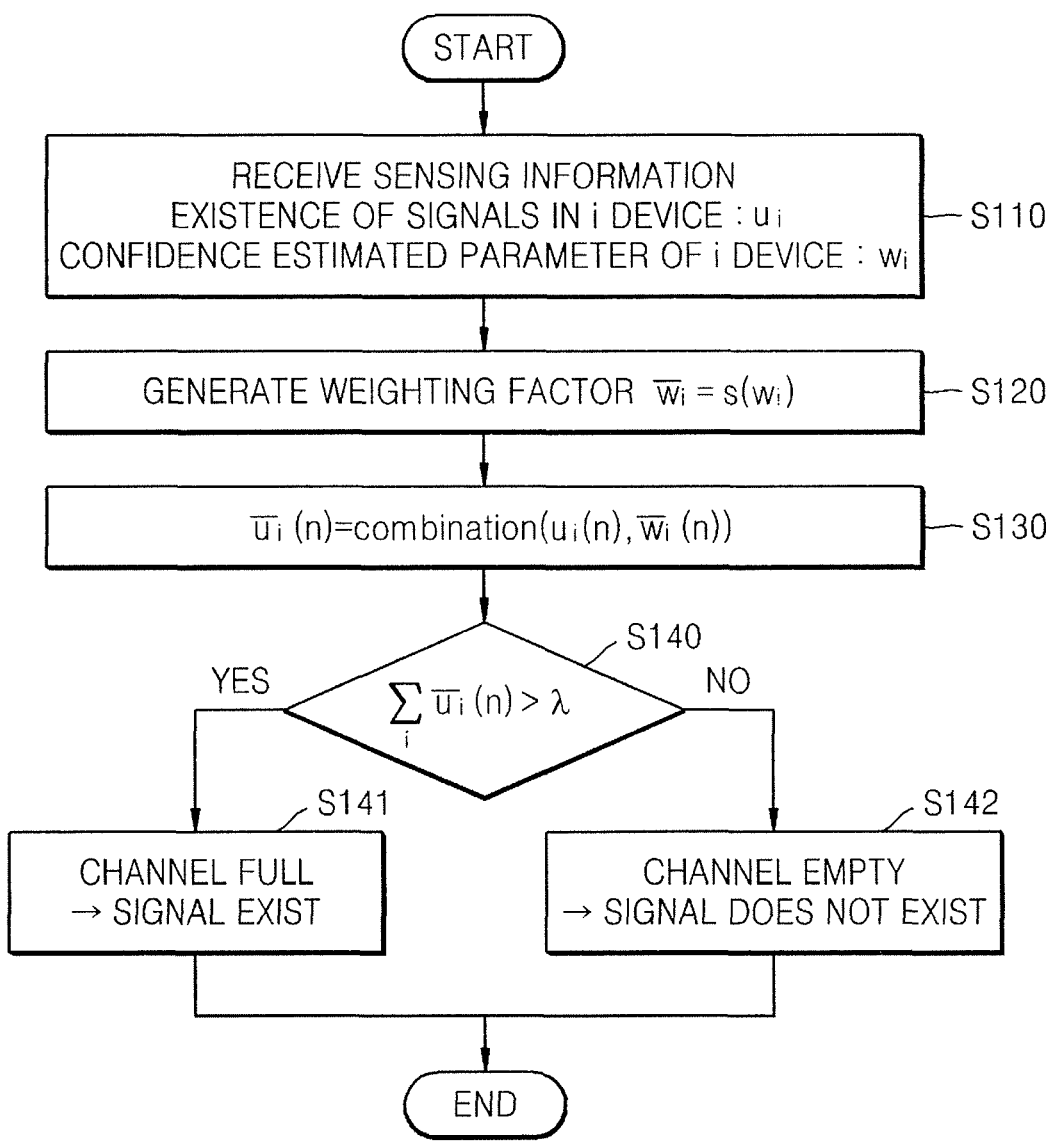
FIG. 1 is a flowchart illustrating a data integration method according to an exemplary embodiment of the present invention.

The present invention will now be described more fully with reference to the accompanying drawings, in which exemplary embodiments of the invention are shown. In the drawings, like reference numerals refer to like elements. In the description, the detailed descriptions of well-known technologies and structures may be omitted so as not to hinder the understanding of the present invention.

FIG. 1 is a flowchart illustrating a data integration method according to an exemplary embodiment of the present invention.

In order to realize the data integration method according to the present invention, sensing information, including a value $U_i$ indicating the existence of signals and a confidence estimated parameter $W_i$ indicating the degree of confidence for the value $U_i$, is received from at least one sensing device (i is an index of a customer premises equipment (CPE). That is, if it is assumed that there are 3 devices in one base station, each device may have one of indexes i=1, 2, 3. Thus, i is an index used to classify the result of each device when receiving sensing results from the number of devices at the base station), in operation 110.

The received confidence estimated parameter Wi is converted to generate a weighting factor $\overline{w}_i$ in the range of 0 to 1, in operation 120.

With regard to FIG. 1, in an IEEE 802.22 Wireless Regional Area Network (WRAN) system, a value of a confidence vector (CV) may be used as the value of the confidence estimated parameter Wi. In addition, the value of the confidence estimated parameter Wi may be obtained using a value of Received Signal Strength Indication (RSSI).

The value of the confidence estimated parameter Wi above is only an example and may be substituted for and changed to a parameter for obtaining the weighting factor $\overline{w}_i$.

Then, the value Ui and the weighting factor $\overline{w}_i$ are used to calculate characteristic values $\overline{u}_i(n)$ indicating the degree of confidence of the sensing information transmitted respectively from the sensing devices (n is a time index, that is, $\overline{u}_i(n)$ indicates the CV at time n of $i^{th}$ device), in operation 130, If the total sum of the characteristic values $\overline{u}_i(n)$ calculated respectively in the sensing devices is greater than a previously set threshold value, in operation 140, it is finally determined that the signals exist, in operation 141. Otherwise, it is finally determined that the signals do not exist, in operation 142.

Figure 2:
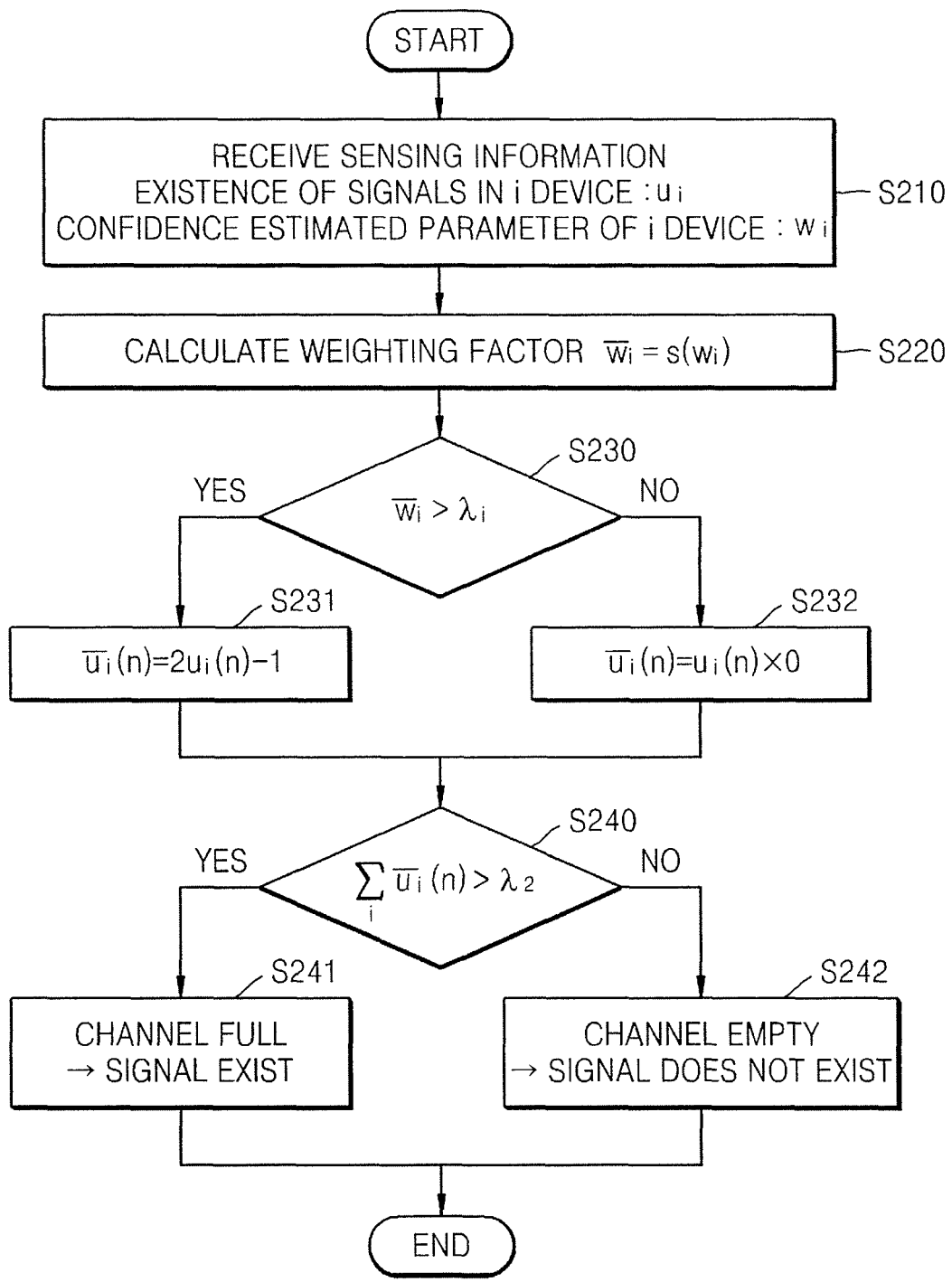
FIG. 2 is a flowchart illustrating a data integration method according to an exemplary embodiment of the present invention.

FIG. 2 is a flowchart illustrating a data integration method executed in an IEEE 802.22 WRAN system, according to an exemplary embodiment of the present invention. In FIG. 2, a value of the CV is used as the weighting factor $\overline{w}_i$.

FIG. 2 is described with reference to the IEEE 802.22 WRAN system. In a data integration apparatus according to an embodiment of the present invention, the value Ui indicating the existence of signals and a value $CV_i$ of the CV from among sensing results transmitted from each CPE of the IEEE 802.22 WRAN system are used, in operation 210.

In the IEEE 802.22 WRAN system, the sensing results transmitted from each CPE include the CV indicating the degree of confidence for the determination on the value Ui indicating the existence of signals, in addition to the value Ui indicating the existence of signals. In the IEEE 802.22 WRAN system, the value $CV_i$ of the CV may be used as a weighting factor.

Since the weighting factor $\overline{w}_i$ is in the range of 0 to 1, 0 is indicated when there is no weighting factor $\overline{w}_i$ and 1 is indicated when there is a weighting factor $\overline{w}_i$. In the IEEE 802.22 WRAN system, the CV is in the range of 0 to 1 and thus an additional operation for converting the CV into the weighting factor $\overline{w}_i$ is not needed. That is, in the IEEE 802.22 WRAN system, the value $CV_i$ of the CV, $\overline{w}_i=w_i=CV_i$, is used as a value of a weight vector, in operation 220.

The value $U_i(n)$ indicating the existence of signals indicates the existence of signals from among the sensing results reported from at least one sensing device i.

When the value $U_i(n)$ is 0, the data integration apparatus according to the present invention determines that signals do not exist by using the weight vector of $\overline{w}_i=w_i=CV_i$. When the value $U_i(n)$ is 1, the data integration apparatus according to the present invention determines that signals exist.

$$\overline{u}_i(n) = \begin{cases} 1, & u_i(n) = 1, \ \overline{w}_i \geq \lambda \\ 0, & \overline{w}_i < \lambda \\ -1, & u_i(n) = 0 \ \overline{w}_i \geq \lambda \end{cases} \quad \text{[Equation 1]}$$

As in Equation 1, in the data integration apparatus, the value $U_i(n)$ and the weighting factor $\overline{w}_i$ received from the at least one sensing device i are used to calculate the characteristic values $\overline{u}_i(n)$ respectively of the sensing devices. In the data integration method, 1 indicating that the signals exist and −1 indicating that the signals do not exist are respectively assigned to the characteristic values $\overline{u}_i(n)$, if the weighting factor $\overline{w}_i$ is greater than a threshold value, and 0 is assigned to the characteristic value $\overline{u}_i(n)$ if the weighting factor $\overline{w}_i$ is below the threshold value, in operations 230 through 232, respectively.

In addition, as in Equation 2 below, the total sum of the characteristic values $\overline{u}_i(n)$ respectively of the sensing devices is obtained. Then, if the total sum is greater than the threshold value, it is finally determined that signals exist; otherwise, it is determined that a channel is empty, in operations 240 through 242, respectively. For example, in Equation 2, 0 is assigned to the threshold value.

$$u(n) = \begin{cases} 1, & \sum_i \overline{u}_i(n) \geq 0 \\ 0, & \sum_i \overline{u}_i(n) < 0 \end{cases} \quad \text{[Equation 2]}$$

Figure 3:
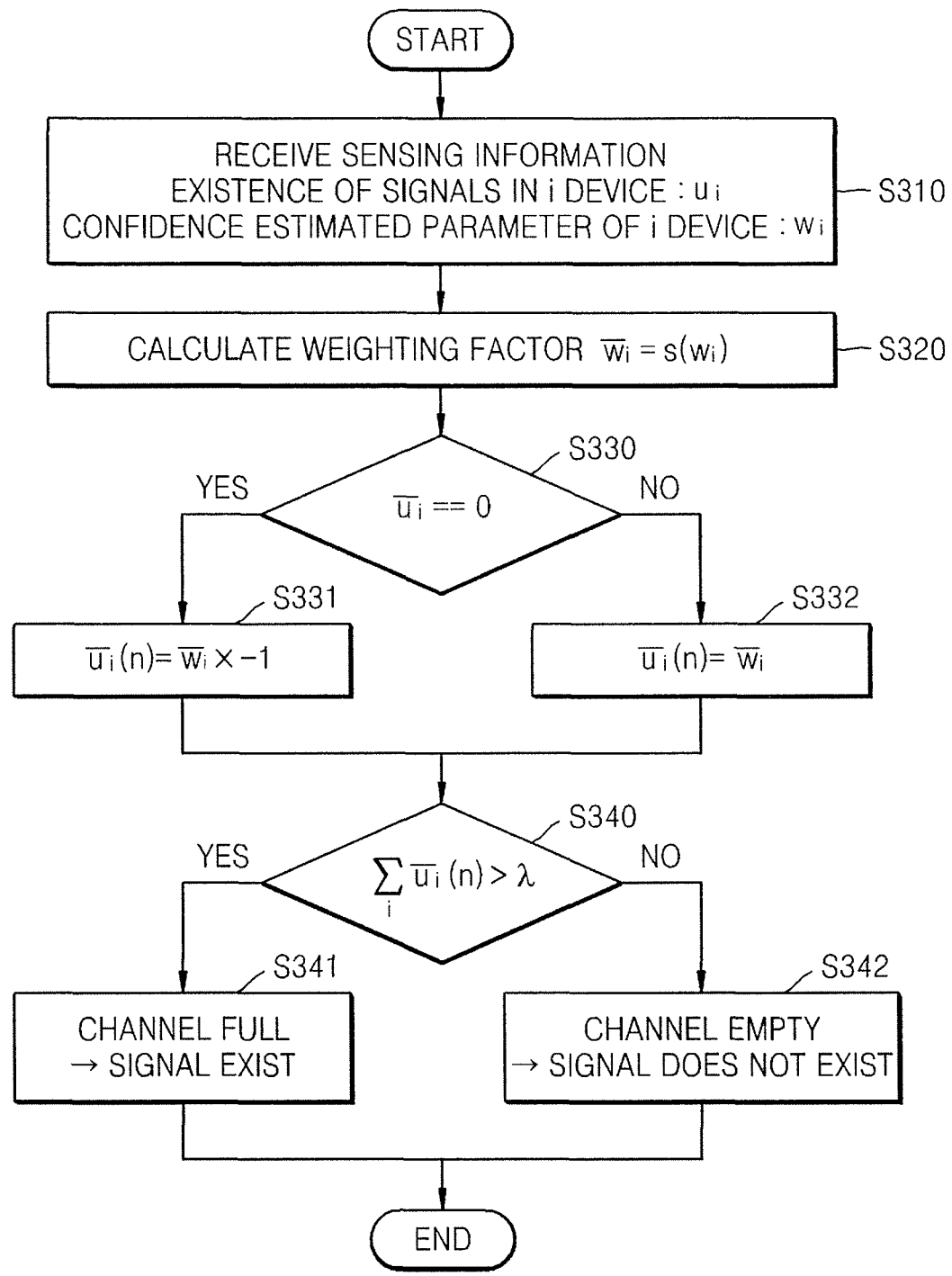
FIG. 3 is a flowchart illustrating a data integration method according to another exemplary embodiment of the present invention.

FIG. 3 is a flowchart illustrating a data integration method according to another exemplary embodiment of the present invention. In FIG. 3, the value $CV_i$ of the CV is used as the weighting factor $\overline{w}_i$. In addition, in FIG. 3, the final results are obtained using the difference of the values $CV_i$ of the CVs respectively of the sensing devices. The value Ui indicating the existence of signals and the value $CV_i$ of the CV from among the sensing results received in the data integration apparatus according to the present invention are used, in operations 310 and 320. However, FIG. 3 is only an example and parameters (for example, RSSI indicating the level of a received signal) indicating the degree of confidence for the value Ui, in addition to the value $CV_i$ of the CV, may be used to obtain the weighting factor $\overline{w}_i$.

In the data integration method, if it is determined that the signals exist based on the value Ui as a sensing result of an $i^{th}$ sensing device, the value $CV_i$ of the CV in the $i^{th}$ sensing device is directly used as the characteristic value $\overline{u}_i(n)$ of the $i^{th}$ sensing device, in operations 330 and 332. If it is determined that the signals do not exist based on the value Ui as a sensing result of $i^{th}$ sensing device, in operation 330, "−1" is multiplied by the value $CV_i$ of the CV in the $i^{th}$ sensing device so as to be used as the characteristic value $\overline{u}_i(n)$ of the $i^{th}$ sensing device, in operation 331, as shown in Equation 3.

$$\overline{u}_i(n) = \begin{cases} \overline{w}_i, & u_i(n) = 1 \\ -\overline{w}_i, & u_i(n) = 0 \end{cases} \quad \text{[Equation 3]}$$

The characteristic values $\overline{u}_i(n)$ respectively of the sensing devices are obtained as in Equation 3. Then, as in Equation 2, the total sum of the characteristic values $\overline{u}_i(n)$ respectively of the sensing devices is obtained. If the total sum is greater than the threshold value, in operation 340, it is finally determined that signals exist; otherwise, it is determined that a channel is empty. It is determined that the threshold value may be set to other values, in addition to 0 as in Equation 2.

Figure 4:
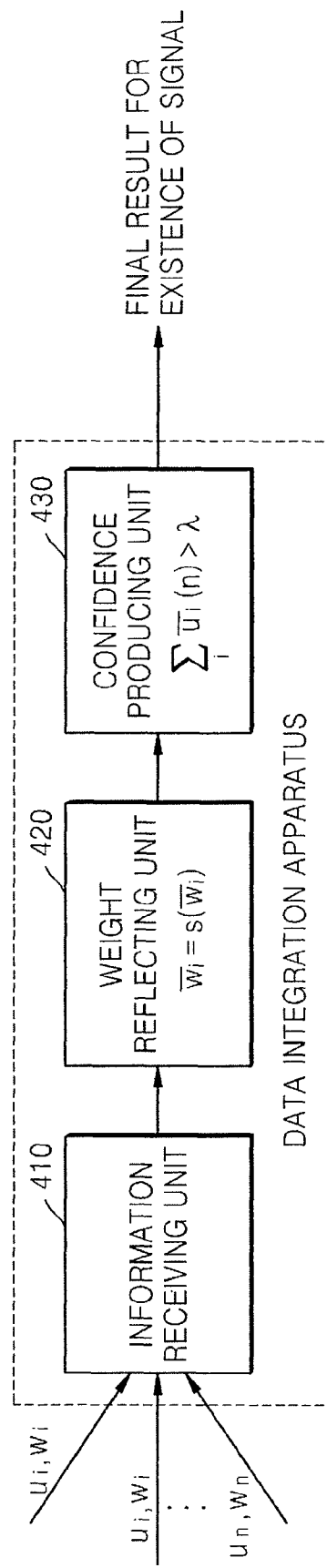
FIG. 4 is a block diagram of a data integration apparatus according to an exemplary embodiment of the present invention.

FIG. 4 is a block diagram of the data integration apparatus according to an exemplary embodiment of the present invention.

The data integration apparatus includes an information receiving unit 410, a weight reflecting unit 420, and a confidence producing unit 430.

The information receiving unit 410 receives sensing information including the value Ui indicating the existence of signals and the confidence estimated parameter Wi for obtaining a weighting factor $\bar{w}_i$ from at least one sensing device.

The weight reflecting unit 420 generates the weighting factor $\bar{w}_i$ based on the parameters, for obtaining a weighting factor, received in the information receiving unit 410. Examples of the parameters for obtaining a weighting factor include a value for CV and RSSI. That is, a value indicating the degree of confidence for the value Ui indicating the existence of signals is used to generate the weighting factor $\bar{w}_i$. In this case, both methods described in FIGS. 2 and 3 may be used to generate the weighting factor $\bar{w}_i$.

The confidence producing unit 430 produces the characteristic values indicating the degree of confidence for the sensing information transmitted respectively from the sensing devices using the value Ui indicating the existence of signals and the weighting factor $\bar{w}_i$. The total sum of the characteristic values produced respectively from the sensing devices is compared to a previously set threshold value and thus the existence of signals received from the sensing devices is finally determined.

As an example of the data integration apparatus according to the present invention, a data integration apparatus in a base station receives sensing information from sensing devices A and B that are outside the base station building and a sensing device C that is inside the base station building and data is integrated as follows.

In the sensing devices A and B that are outside the base station building, information shown as Ui(a) and Ui(b) indicating that signals exist and values Wi(a) and Wi(b) indicating high confidence for the value Ui are transmitted to the base station. In the sensing device C that is inside the base station building, information shown as Ui(c) indicating that signals do not exist, on the assumption that the signals are not received, and a high confidence estimated parameter Wi(c) are transmitted to the base station.

In the data integration apparatus in the base station, values Wi(a), Wi(b), and the high confidence estimated parameter Wi(c) are respectively converted into the weighting factors and the characteristic values respectively of the sensing devices are obtained by carrying out an operation with information Ui(a), Ui(b), and Ui(c). Then, when the total sum of the characteristic values respectively of the sensing devices A, B, and C is greater than the threshold value, it is finally determined that signals exist. When the total sum of the characteristic values respectively of the sensing devices A, B, and C is lower than the threshold value, it is finally determined that signals do not exist.

Figure 5:
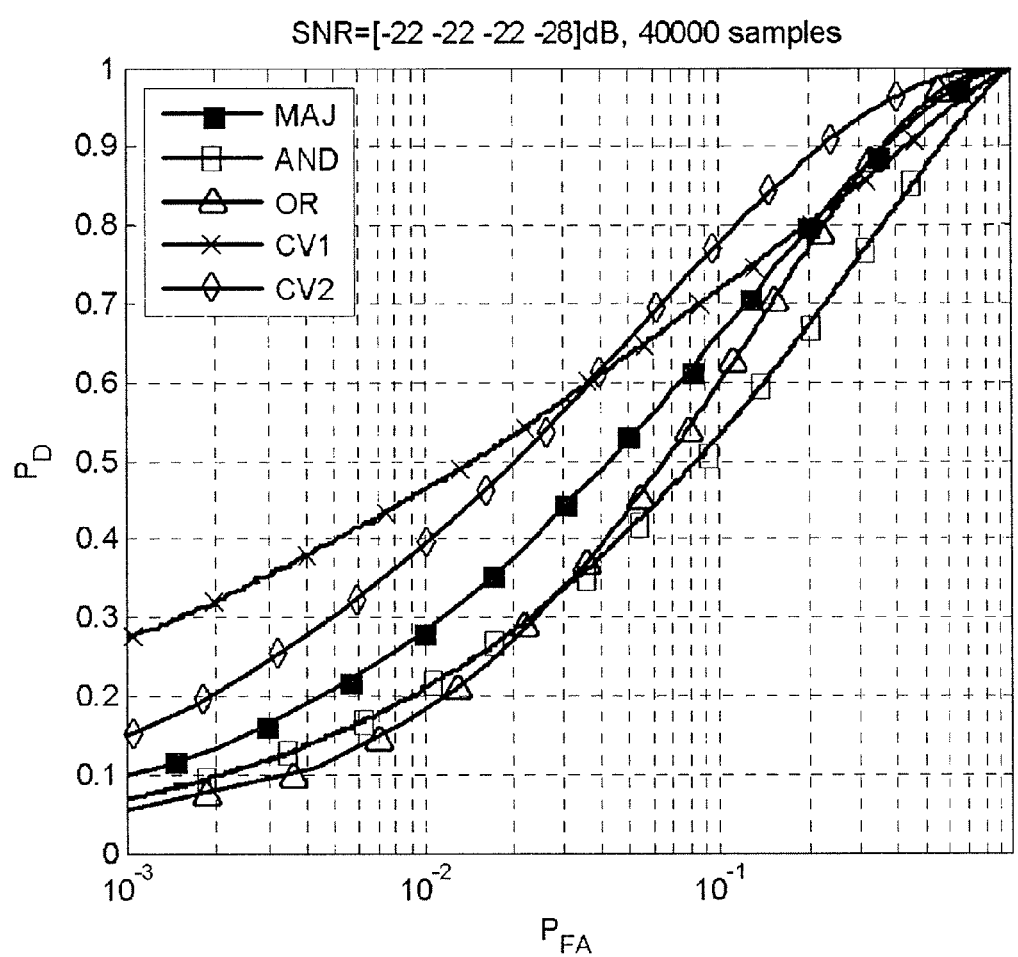
FIG. 5 is a graph illustrating detection performance according to various data integration methods when there are four sensing devices, three of which have a similar signal to noise ratio (SNR) and one of which is a hidden terminal.
Figure 6:
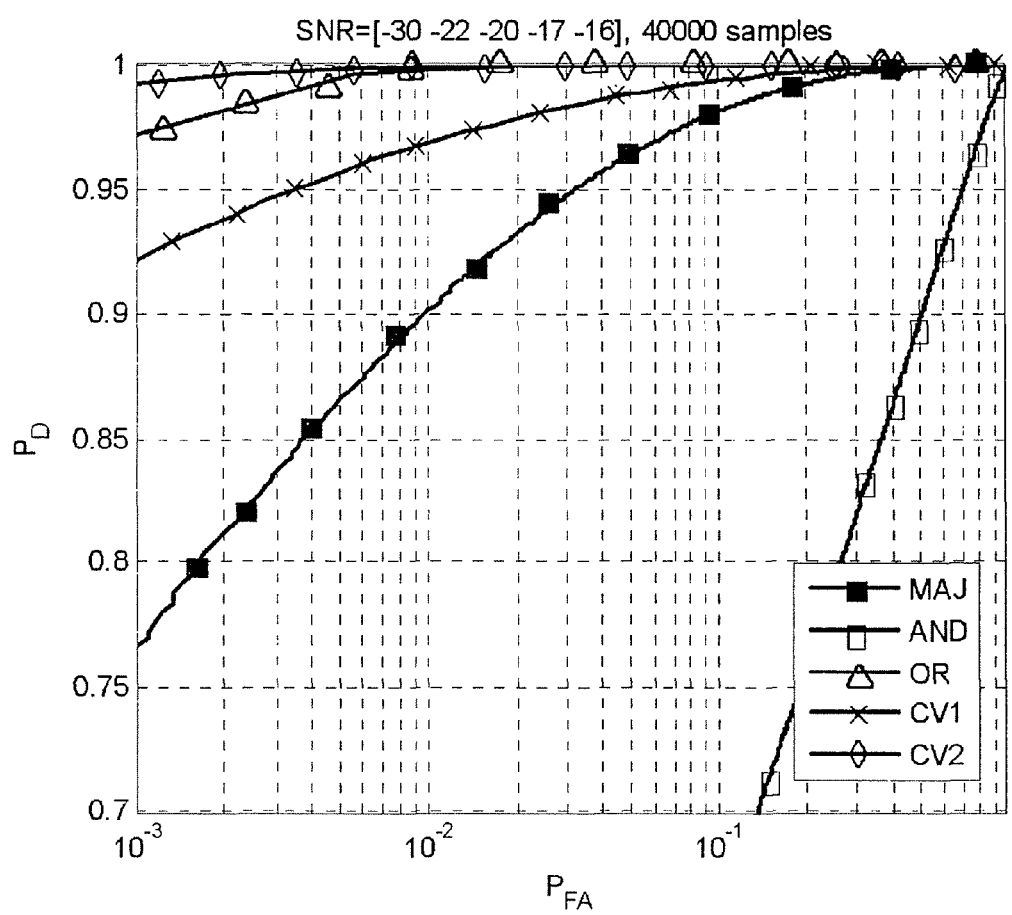
FIG. 6 is a graph illustrating the detection performance of a data integration method according to an embodiment of the present invention when there are five sensing devices having various SNRs.

In FIGS. 5 and 6, each sensing device detects signals through an energy detection method, in which 4000 samples are used in a signal to noise ratio (SNR) condition.

FIG. 5 is a graph illustrating detection performance according to various data integration methods when there are four sensing devices, three of which have a similar SNR and one of which is a hidden terminal.

When the sensing devices have a similar SNR, the Majority logic method shows the most excellent performance from among AND, OR, and Majority logic methods. However, when one hidden terminal exists, two data integration methods CV1 and CV2 described above, according to the present invention, using the weighting factor show a more excellent detection performance than that of the Majority logic method.

FIG. 6 is a graph illustrating the detection performance of a data integration method according to an embodiment of the present invention when there are five sensing devices having various SNRs. In this case, the OR method shows the most excellent performance from among AND, OR, and Majority logic methods. However, as illustrated in FIG. 5, since the data integration method described with reference to FIG. 3 has a lower probability of false alarm, a higher detection performance than the conventional OR method is shown.

When the sensing devices have a similar SNR, the most excellent performance is shown in the data integration method using a Majority logic method. When the sensing devices have different SNRs, the most excellent performance is shown in the data integration method using an OR logic method.

Accordingly, in the prior art, a data integration method varies according to a received SNR condition of the sensing device. However, in actual realization of the data integration method, when a low SNR is received, the SNR may be hardly estimated.

According to the present invention, the weighting factor $\bar{w}_i$ and the value Ui indicating the existence of signals are applied together to the data integration method so that detection performance of the data integration method can be improved regardless of the SNR of signals received in each sensing device.

The invention can also be embodied as computer readable code on a computer readable recording medium. The computer readable recording medium is any data storage device that can store data which can be thereafter read by a computer system.

Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A data integration apparatus having a data processor, the data integration apparatus comprising:
    an information receiving unit, operating on the data processor, the information receiving unit receiving sensing information from each of a plurality of sensing devices, the sensing information comprising a value indicating the existence of signals and a confidence estimated parameter indicating the degree of confidence for the value indicating the existence of signals;
    a weight reflecting unit, operating on the data processor, the weight reflecting unit generating a weighting factor based on the confidence estimated for each of the plurality of sensing devices; and
    a confidence producing unit, operating on the data processor, the confidence producing unit producing a characteristic value for each of the plurality of sensing devices, wherein the characteristic value indicates the degree of confidence of the sensing information transmitted from a sensing device and is produced using the value indicating the existence of signals and the weighting factor, and wherein the total sum of the characteristic values produced from the sensing devices is compared with a previously set threshold value in order to finally determine whether the signals exist.

2. The apparatus of claim 1, wherein in the confidence producing unit, "1" indicating that the signals exist and "−1" indicating that the signals do not exist are assigned to the characteristic value when the weighting factor is greater than a previously set threshold value, and 0 is assigned to the characteristic value when the weighting factor is below the previously set threshold value.

3. The apparatus of claim 1, wherein in the confidence producing unit, when it is determined that the signals exist based on the value indicating the existence of signals, the weighting factor is used as the characteristic value and when it is determined that the signals do not exist based on the value indicating the existence of signals, "−1" is multiplied by the weighting factor so as to be used as the characteristic value.

4. The apparatus of claim 1, wherein the confidence estimated parameters comprise at least one of a value for a confidence vector and a value of Received Signal Strength Indication (RSSI) indicating a level of intensity of signals received from the at least one sensing device.

5. A data integration method comprising:

receiving sensing information from each of a plurality of sensing devices, the sensing information comprising a value indicating the existence of signals and a confidence estimated parameter indicating the degree of confidence for the value indicating the existence of signals;

generating a weighting factor based on the confidence estimated for each of the plurality of sensing devices; and producing a characteristic value for each of the plurality of sensing devices, wherein the characteristic value indicates the degree of confidence of the sensing information transmitted from a sensing device and is produced using the value indicating the existence of signals and the weighting factor, and wherein the total sum of the characteristic values produced from the sensing devices is compared with a previously set threshold value in order to finally determine whether the signals exist.

6. A data integration method comprising:

receiving sensing information from at least one sensing device, the sensing information comprising a value indicating the existence of signals and confidence estimated parameters indicating the degree of confidence for the value indicating the existence of signals;

generating a weighting factor based on the confidence estimated parameters; and producing characteristic values indicating the degree of confidence of the sensing information transmitted from each sensing device using the value indicating the existence of signals and the weighting factor, wherein in the characteristic values, 1 indicating that the signals exist and −1 indicating that the signals do not exist are respectively assigned to the characteristic values based on the value indicating the existence of signals, if the weighting factor is greater than a previously set threshold value, and 0 is assigned to the characteristic values if the weighting factor is below the previously set threshold value.

7. The method of claim 5, wherein the weighting factor is used as the characteristic value when it is determined that the signals exist based on the value indicating the existence of signals and −1 is multiplied by the weighting factor, when it is determined that the signals do not exist based on the value indicating the existence of signals, so as to be used as the characteristic value.

8. The method of claim 5, wherein the confidence estimated parameters comprise at least one of a value for a confidence vector and a value of Received Signal Strength Indication (RSSI) indicating a level of intensity of signals received from the sensing device.

* * * * *